United States Patent [19]
Kersey et al.

[11] 4,077,573
[45] Mar. 7, 1978

[54] INDEPENDENTLY MOUNTED THRESHER CUTTERS

[75] Inventors: Carl H. Kersey; Charles D. Hansen, both of Richmond, Va.

[73] Assignee: AMF Incorporated, White Plains, N.Y.

[21] Appl. No.: 759,706

[22] Filed: Jan. 17, 1977

Related U.S. Application Data

[63] Continuation of Ser. No. 651,884, Jan. 23, 1976, abandoned.

[51] Int. Cl.² .............................................. B02C 18/18
[52] U.S. Cl. ..................................... 241/32; 241/191; 241/195; 241/243
[58] Field of Search ................. 241/32, 189 R, 189 A, 241/190, 191, 195, 243; 30/339

[56] References Cited

U.S. PATENT DOCUMENTS

| | | | |
|---|---|---|---|
| 3,139,918 | 7/1964 | Gronberg | 241/191 UX |
| 3,141,485 | 7/1964 | Bonner, Jr. et al. | 241/243 X |
| 3,220,658 | 11/1965 | Shelton, Jr. | 241/32 |
| 3,325,900 | 6/1967 | Sohlberg | 30/339 X |
| 3,380,502 | 4/1968 | Gronberg | 241/191 X |
| 3,708,127 | 1/1973 | Brewer | 241/32 |

*Primary Examiner*—Roy Lake
*Assistant Examiner*—Howard N. Goldberg
*Attorney, Agent, or Firm*—George W. Price; Charles J. Worth

[57] ABSTRACT

In a thresher, means for independently mounting cutters and for replacing each cutter without disturbing other cutters, the rotor or the fixed cutter mounting means.

7 Claims, 4 Drawing Figures

INDEPENDENTLY MOUNTED THRESHER CUTTERS

This is a continuation of application Ser. No. 651,884, filed Jan. 23, 1976, now abandoned.

This invention relates generally to threshers and the like, and more particularly to the cutters, blades or teeth thereof and means for mounting the same.

It is well known in the art as shown in U.S. Pat. Nos. 2,760,492 and 3,141,485 granted Aug. 28, 1956 and July 21, 1964, respectively, to make thresher rotors from composite assemblies of disks, rings, plates and/or spacers, and to connect or mount separate teeth or cutters on to the rotor and/or stator as desired. In such prior constructions as heretofore available a separate seat or socket was provided to receive each tooth or cutter, and the laterally aligned teeth or cutters were retained in groups in their respective seats by the tie rods which hold the composite rotor or stator tooth mounting together.

An impact of the teeth or cutters of a thresher and a foreign object in the leaves being threshed often causes the teeth involved to deform and to deform their seats thus structurally damaging the rotor and/or the stator blade mounting assembly. The thresher then must be disassembled not only to replace damaged blades but to repair structural damage.

A tooth that breaks or fails on impact can be more destructive and more hazardous than a deformed tooth. The portion of the tooth so broken off itself becomes foreign matter which can cause further damage or can be propelled, by centrifugal force resulting from high rotor speeds, outwardly against and possibly through the rotor housing.

Accordingly, an object of the present invention is to provide thresher teeth or cutters which upon impact with foreign matter in leaves being threshed will not structurally damage the rotor or rotor housing.

Another object of the present invention is to mount such thresher teeth or cutters to minimize or prevent breaking or shattering upon impact with foreign matter in leaves being threshed.

And another object of the present invention is to mount such thresher teeth or cutters to rotate out of their normal operating positions by a predetermined amount of force due to impact with foreign matter in the leaves being threshed.

Still another object of the present invention is to mount such teeth or cutters in a manner to facilitate replacement.

And still another object of the present invention is to mount thresher teeth or cutters in a manner to permit replacing each tooth when damaged without disturbing the other teeth, the rotor or the stator tooth mounting.

The foregoing and other objects and advantages will appear more fully hereinafter from a consideration of the detailed description wherein one embodiment of the invention is illustrated by way of example. It is to be expressly understood, however, that the drawing is for illustration purposes only and is not to be construed as defining the limits of the invention.

Figure 1:
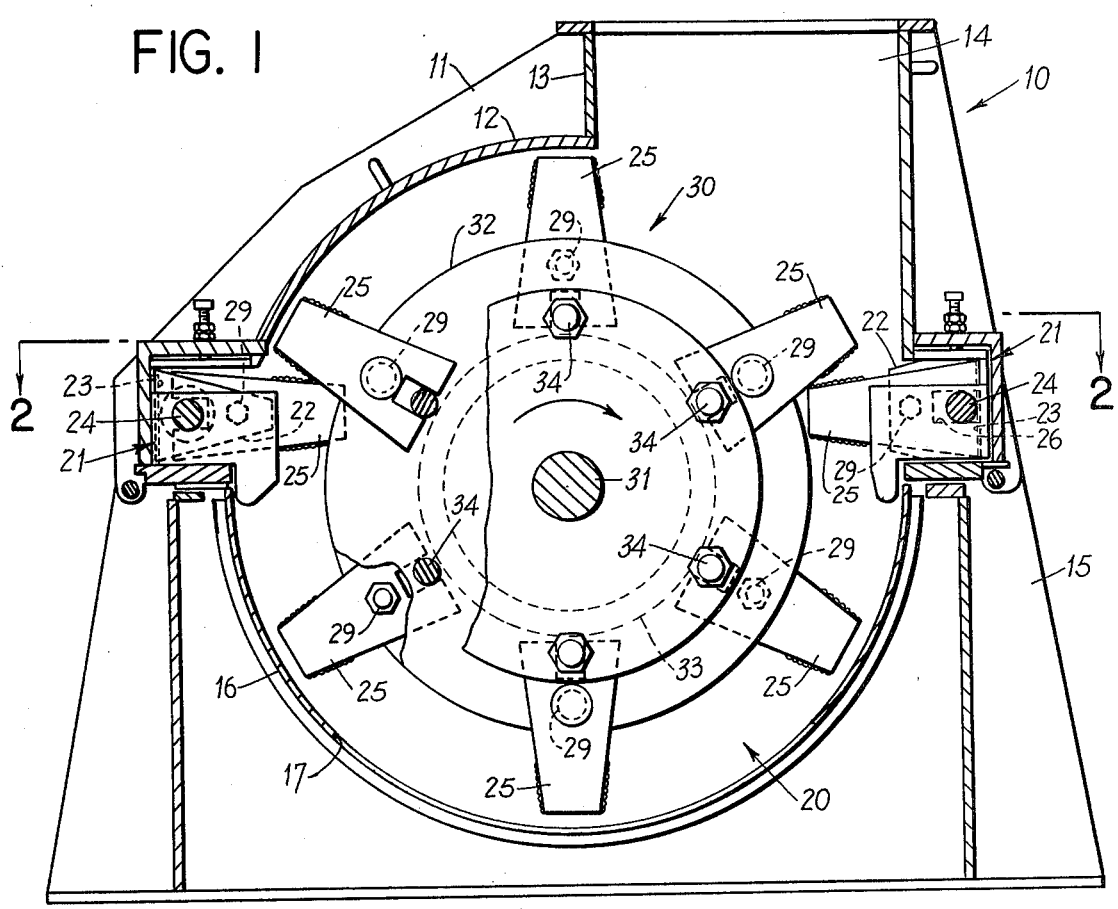
FIG. 1 is an end elevational view of a thresher rotor and housing made in accordance with the present invention in which the housing end plate is removed to more fully illustrate the operating parts thereof.
Figure 2:
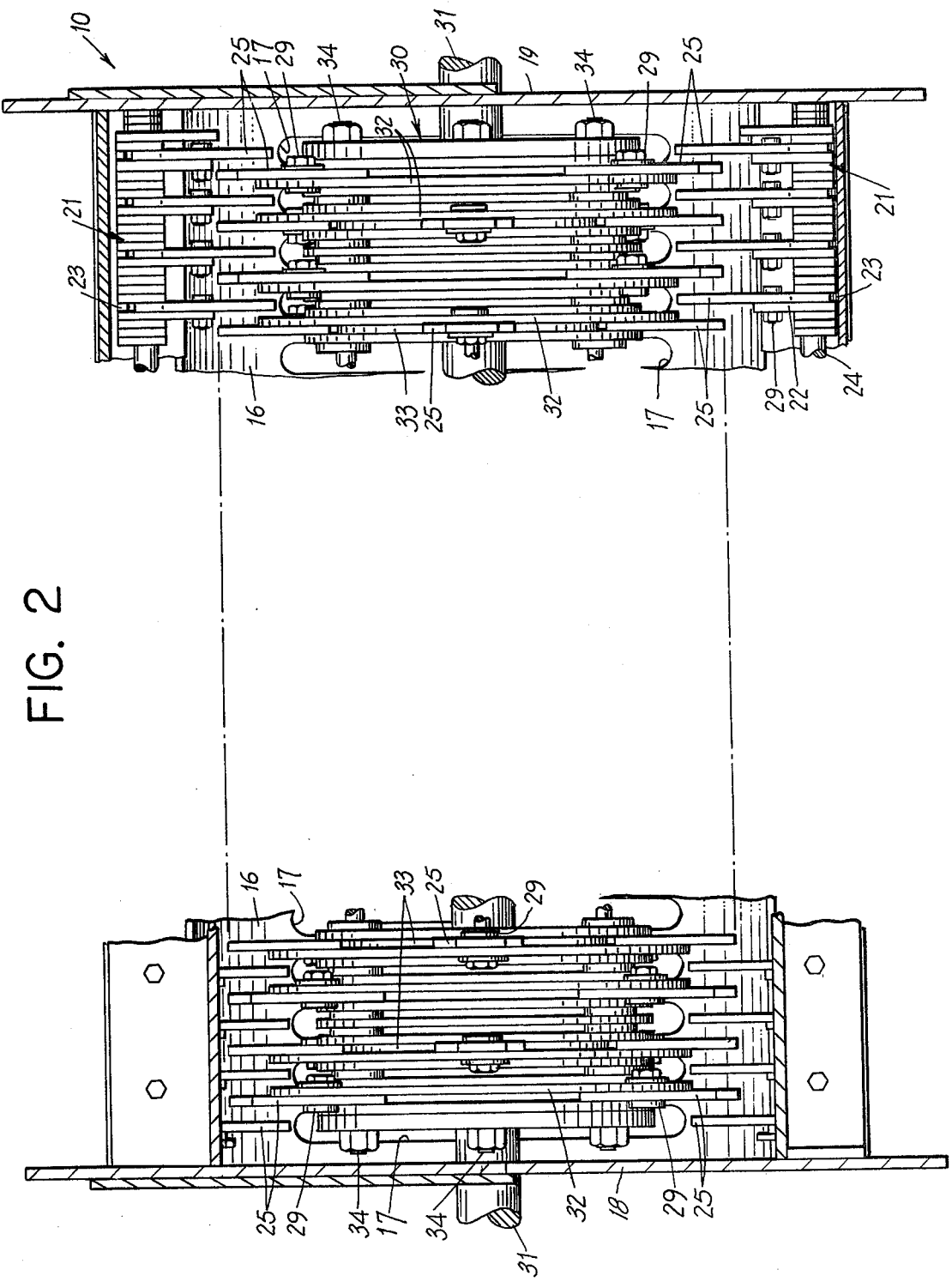
FIG. 2 is a sectional view of the rotor housing taken on line 2—2 of FIG. 1 with the rotor being shown in plan and the center portions of the housing and rotor broken away to facilitate illustration.

Referring now to the drawings and particularly to FIGS. 1 and 2, a thresher made in accordance with the present invention is provided with a housing 10 having an upper portion 11 and a lower portion 15 for a rotor 30.

The upper housing portion 11 has an arcuate wall 12 with a neck arrangement 13 defining an inlet or charging opening 14 for leaves to be threshed. The lower housing portion 15 has an arcuate or semicircular grid or wall 16 for supporting leaves being threshed. The grid or wall 16 is provided with suitable openings 17 forming the discharge for threshed leaves. The arcuate walls 12 and 16 define a rotor chamber 20 closed at its ends by a pair of spaced end walls 18 and 19 while the adjacent surfaces of the upper and lower housing portions 11 and 15 are formed to receive two fixed cutter mounting means 21 each on a side of the chamber 20 opposite from the other. From the foregoing it should be readily understood that the housing 10 is a conventional housing as shown in the aforementioned U.S. Pat. Nos. 2,760,492 and 3,141,485.

Each of the fixed or stator teeth or cutter mounting means 21 is provided with a set or nest of plates which extend substantially the width of the chamber 20 and are connected together by a tie rod or bar 24. Each such set of plates includes an appropriately spaced series of larger mounting plates 22 which extend into the rotor chamber 20 past the ends of other plates and a series of spacer plates 23 each disposed adjacent one of the mounting plates. The spacer plates 23 are disposed only on the outer or remote sides of the tie rods 24 from the chamber 20 thereby forming a slot for a cutter 25 adjacent each of the mounting plates 32.

Figure 3:
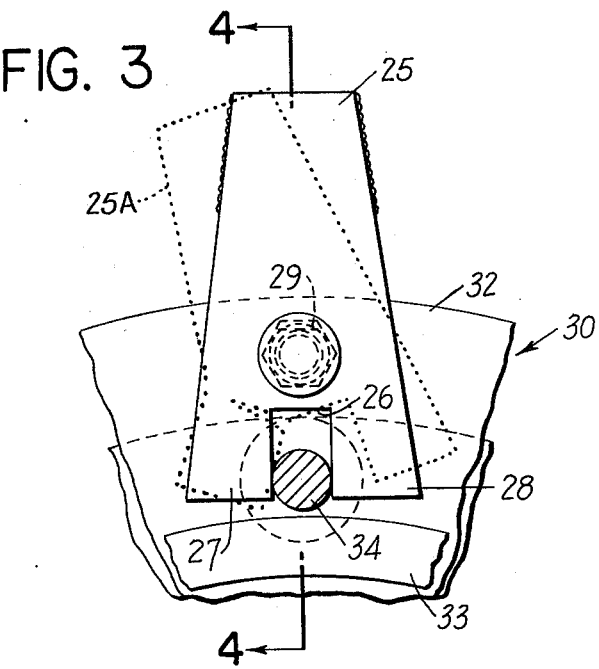
FIG. 3 is an enlarged fragmentary view of one of the rotor blades and the adjacent rotor structure of FIG. 1.

The mounting end of each tooth or cutter 25, as shown in FIG. 3, is bifurcated thereby providing a central open ended slot 26 between a pair of legs 27 and 28, and a hole axially spaced from the open ended slot 26. For mounting in one of the mounting means 21, a tooth or cutter 25 is inserted in a slot in the plates formed by a spacer plate 23 until the tie rod 24 is disposed in the open ended slot 26 with legs 27 and 28 disposed on opposite sides of the tie rods and the hole in the cutter is aligned with a corresponding hole in the adjacent mounting plate 22. Fastening means 29 inserted through the aligned holes is provided to connect the cutter 25 to the adjacent mounting plate 23. To replace a damaged fixed or stator tooth or cutter, the appropriate fastening means 29 is removed and the disconnected cutter 25 is then merely withdrawn from the holding means 21 without disturbing the plates of the holding means or the other cutters.

Figure 4:
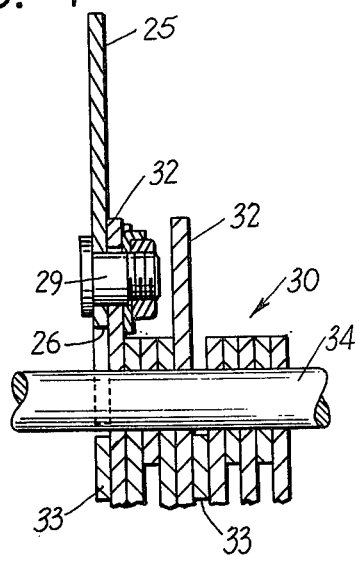
FIG. 4 is a view taken on line 4—4 of FIG. 3.

The rotor 30 is comprised of a set or nest of plates, discs, rings and/or spacers, hereafter merely called rotor plates, which are mounted on a rotor shaft 31 and connected together by an equally spaced arcuate series of six tie rods or bars 34. The set or nest of rotor plates extends substantially the width of the rotor chamber 20 and is provided with an appropriately spaced series of mounting plates 32 each of which is of a larger diameter than the other rotor plates, and is provided with six holes for the tie rods 34 and a set of three equally spaced holes for cutter connecting means 29 each radially spaced from and aligned with one of the holes for the tie rods. A spacer plate 33 is provided adjacent to each of the mounting plates 32 and has an outer circumference sufficinetly small to fit within the tie rods or bars 34 thereby forming an annular slot in the rotor 30 adjacent each mounting plate, as shown in FIGS. 1, 3 and 4.

While the rotor 30 is shown and described as having six tie rods 34 and means for connecting three cutters 25 to each of the plates 32, these quantities are for illustration purposes only and are not intended to define the limits of the present invention.

To mount a cutter 25 on the rotor 30, the cutter is inserted into one of the annular slot formed by a spacer plate 33 with its slot 26 aligned to receive a tie rod 34. The cutter 25 is then positioned to align the fastener hole therethrough with the fastener hole in the adjacent plate 32 which is aligned with the tie rod 34 disposed in the slot 26. The fastening means 29 is inserted through the aligned hole and is used to connect the cutter 25 to the adjacent plate 32. To replace a cutter, a single fastening means 29 is removed and the disconnected cutter 25 is removed from the rotor 30.

It should be readily understood that a plurality of cutters 25 are independently connected to and can be independently removed from each of a plurality of mounting plates 32 which are disposed at spaced intervals from one end of the rotor 30. A cutter 25 connected to a mounting plate 32 as described which would normally be rotatable on its single fastening means 29, is provided with legs 27 and 28 which engage the tie rod 34 disposed in the open ended slot 26 forming means to normally prevent the cutter from rotating as best shown in FIG. 3. The cutter leg 27 and 28 are made to withstand a predetermined amount of force. However, impact with a heavy foreign object will cause the trailing leg 27 to bend and possibly tear near the closed end of the slot 26 as the cutter 25 is caused to rotate; shown in dotted lines as 25A in FIG. 3. If the impact force is sufficiently severe the leg 27 will continue to bend and/or tear and finally clear the tie bar 34 thereby permitting the cutter to further rotate from its position 25A to a position with its cutting edge lying adjacent the periphery of the mounting plate 32. Thus, while such a cutter 25 is no longer being used, it has not shattered or become free from the rotor to form additional foreign matter in the leaves being threshed which could cause further damage.

As best shown in FIG. 3, the cutting faces of each cutter 25 are tapered outwardly. The resulting angle of the advancing face of a cutter tends to throw the threshed tobacco outwardly toward the arcuate wall 16 and the discharge openings 17 therein, thereby increasing the efficiency of the thresher.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

We claim:

1. In a thresher, the combination comprising
plate means connected together by tie rods and being provided with a spaced series of mounting plates and a slot adjacent each of said mounting plates,
a plurality of cutters each adjacent one of said series of mounting plates, and having one end disposed in one of said slots and extending outwardly from said plate means,
a plurality of removable fastening means each rotatably connecting a different one of said cutters to the adjacent mounting plate, and
each cutter having means to prevent rotation until a predetermined amount of force imposed on said cutter is exceeded and to permit rotation on said fastening means thereafter.

2. In a thresher, the combination in accordance with claim 1, and
each of said mounting plates having at least one opening therethrough radially aligned with one of said tie rods,
each of said cutters having an opening therethrough aligned with said opening through said adjacent mounting plate and means for engaging said tie rod radially aligned with said opening in said adjacent mounting plate to prevent said cutter from rotating relative to said adjacent mounting plate, and
each of said fastening means extending through said aligned openings in a different one of said cutters and said mounting plate adjacent thereto.

3. In a thresher, the combination in accordance with claim 2 wherein said means for engaging said tie rod comprises said one end disposed in a slot of each of said cutters having
a central open ended slot axially aligned with and spaced from said opening for said fastening means for receiving one of said tie rods, and
a pair of legs each on a different side of said open ended slot and engaging the opposite side of said tie rod in said open ended slot from the other of said pair of legs to prevent said cutter from rotating relative to said adjacent mounting plate when mounted.

4. In a thresher, the combination in accordance with claim 1 and
a thresher rotor forming said plate means and being provided with a shaft, a series of circular plates including said mounting plates mounted on said shaft and connected together by said tie rods,
said tie rods being disposed in an equally spaced arcuate series each extending through each of said slots of said plate means,
said fastening means for connecting cutters to each of said mounting plates each being radially spaced outwardly from a different one of said tie rods and being equally spaced arcuately from each other.

5. In a thresher, the combination in accordance with claim 4, and
said end of each said cutter disposed in a slot having an open ended slot for receiving a tie rod and a pair of legs each on a different side of said open ended slot and engaging the opposite side of a tie rod in said open ended slot from the other of said pair of legs to prevent said cutter from rotating relative to said adjacent mounting plate when mounted.

6. In a thresher, the combination comprising
rotating plate means connected together by rods and being provided with a spaced series of mounting plates and a slot adjacent each of said mounting plates,
a plurality of cutters each connected to one of said series of mounting plates, and having one end disposed in said slot adjacent to said mounting plate to which said cutter is connected,
each of said cutters extending radially outward from said plate means and having opposed edges providing two cutting faces tapered toward one another, and one of said two cutting faces of each of said cutters advancing in the direction of rotation of said plate means urging threshed tobacco outwardly from said rotating plate means.

7. In a thresher, the combination in accordance with claim 6, and a plurality of removable fastening means each rotatably connecting a different one of said cutters to the adjacent mounting plate, and each cutter having means to prevent rotation until a predetermined amount of force imposed on said cutter is exceeded and to permit rotation on said fastening means thereafter.

* * * * *